United States Patent Office 3,020,262
Patented Feb. 6, 1962

3,020,262
METHOD FOR PRODUCING 2-OXAZOLIDONES FROM EPOXIDES AND ISOCYANATES
George P. Speranza, Austin, Tex., assignor to Jefferson Chemical Company, Inc., Houston, Tex., a corporation of Delaware
No Drawing. Filed Dec. 19, 1957, Ser. No. 703,767
14 Claims. (Cl. 260—47)

The present invention relates to the manufacture of useful oxazolidone products by the reaction of an organic isocyanate with an epoxide in the presence of an addition catalyst. In particular, the invention relates to an improved method for producing 3-substituted 2-oxazolidones. The latter are compounds of known utility (see U.S. 2,399,118 and 2,773,067) as chemical intermediates and in the manufacture of resins and plastics. The invention also relates to the production of valuable resins by the reaction of an organic diisocyanate with a diepoxide.

A number of methods have been suggested for preparing 2-oxazolidones, including such methods as the transesterification of N-(2-hydroxyalkyl)-2-hydroxyalkyl carbamate and the reaction of amino alcohols with diethyl carbonate. These methods, however, leave much to be desired in regard to the yield of the oxazolidone, economy and availability of reactants and the ease with which the product may be produced and recovered. In contrast, the present method provides a relatively simple and economical method for producing 3-substituted 2-oxazolidones.

In accordance with this method, a 3-substituted 2-oxazolidone is produced by the addition reaction of an organic isocyanate with an alkylene oxide. It has been reported in the literature that the reaction of phenylisocyanate with ethylene oxide gives triphenylisocyanurate, M.P. 278° C. (CA 31, 1377). It has now been discovered that, when the reaction is conducted in the presence of an effective addition catalyst, a good yield of a 3-phenyl 2-oxazolidone is obtained.

In practice, the reactants, i.e., the organic isocyanate and the alkylene oxide, are added to a reaction vessel which is provided with a closure device and a suitable agitator means. A minor amount of an addition catalyst is also added to the reactants in the vessel. An organic solvent may also be employed to allow the formation of a homogeneous solution which will facilitate the reaction, although the solvent is not necessary. The vessel is sealed and the reaction mixture heated to speed up the reaction. The reaction will normally be completed in a relatively short time. On completion of the reaction, the solvent and unreacted alkylene oxide are conveniently removed by distillation leaving the 2-oxazolidone product in the reaction vessel. Removal of the solvent and unreacted alkylene oxide may, of course, be conducted under reduced pressure. The product is recovered from the reaction vessel and, if a solid, is normally purified by recrystallization from a suitable solvent.

This process, as indicated above, is essentially an addition reaction which takes place between an organic isocyanate and an alkylene oxide. The class of isocyanates which may be employed are the organic isocyanates. These materials may also be represented by the formula:

R—N=C=O in which R represents a member from the group consisting of alkyl, cycloalkyl, aryl, alkaryl and aralkyl radicals, or R represents the foregoing radicals attached to another isocyanate group in the case of a diisocyanate. The radicals are normally hydrocarbon radicals having from 1 to about 16 carbon atoms. Typical organic isocyanates which may be employed include phenylisocyanate, 2,4-toluenediisocyanate, methylisocyanate, ethylisocyanate, butylisocyanate, tolueneisocyanate, and benzylisocyanate.

The alkylene oxides which may be employed are also known as epoxides or oxirane compounds. These compounds are characterized by having an oxygen atom attached to two adjacent carbon atoms. The alkylene oxides having the oxygen atom attached at the 1,2 positions in the hydrocarbon chain, that is at a terminal position in the chain, have been observed to be particularly effective. The alkylene oxides may be represented by the formula:

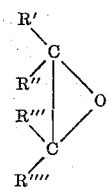

in which R'', R''' and R'''' may be hydrogen, or a member selected from the group consisting of alkyl, cycloalkyl, aryl, alkaryl, aralkyl and alkenyl radicals in which the radicals have from 2 to 20 carbon atoms and R' may have the values noted for R'', R''' and R'''' or may represent another alkylene oxide radical

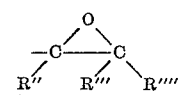

in which R'', R''' and R'''' have the values noted above. At the present time, ethylene oxide is the most important commercially, with propylene oxide probably next in commercial importance. Other suitable epoxides include 1,2-butylene oxide, 1,2-dodecylene oxide, 1,2-octylene oxide and the diepoxide formed from epichlorohydrin and bis-(4-hydroxyphenyl)dimethylmethane.

The reaction is a combination of the isocyanate with the epoxide and may be represented by the following equation:

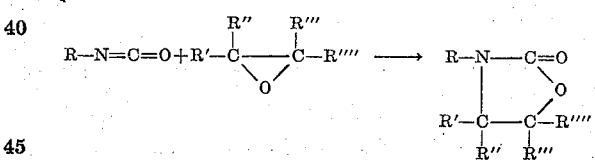

where the various R radicals have the meaning as set forth above. It will be appreciated that a diisocyanate, such as 2,4-toluene-diisocyanate will react with two epoxy equivalents and that a diepoxide will combine with two isocyanate equivalents.

Resins may also be formed by this process. Thus, diisocyanates, such as toluene-diisocyanate and diepoxides, such as the diepoxide obtained from epichlorohydrin and bis(4-hydroxyphenyl) dimethylmethane may be reacted under the conditions set out above to form resinous compositions characterized by having extremely high melting points.

The reaction between an organic isocyanate and an alklene oxide to produce a 2-oxazolidone is critical with respect to the catalyst. In other words, an addition catalyst effective to produce 2-oxazolidone must be employed. Suitable catalysts for this reaction include the trialkylamines, alkali metal halides and the ammonium halides represented by the formula:

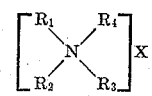

in which X is an atom selected from the group consisting of fluoride, chloride, bromide and iodide and $R_1$, $R_2$, $R_3$ and $R_4$ may each be hydrogen, or an alkyl, cycloalkyl, aryl, alkaryl or aralkyl radical. The hydrocarbon radicals represented by $R_1$, $R_2$, $R_3$ and $R_4$ may have from 1–16 carbon atoms and the alkyl radicals on the trialkylamines may have from 1–8 carbon atoms.

While the iodides, bromides, chlorides and fluorides are all effective in catalyzing the oxazolidone formation, it has been found that the iodides and bromides are more effective than the chlorides and fluorides. The bromides are preferred because they are generally more stable and present the least trouble with regard to the recovery of a pure product. Examples of catalysts which may be employed include: tetraethyl-ammonium bromide, tetramethyl-ammonium bromide, benzyltriethyl-ammonium bromide, tetrabutyl-ammonium bromide, triethyl-ammonium bromide, phenyltrimethyl-ammonium bromide, octadecyltrimethyl-ammonium bromide, diallyldiethyl-ammonium bromide, potassium bromide, sodium bromide and the corresponding iodides, chlorides and fluorides in addition to trialkylamines, such as triethylamine, trimethylamine, tributylamine and trioctylamine. The catalysts preferred, by far, are the quaternary ammonium halides which are more specific in action and produce substantially higher yields of the 2-oxazolidone product. The amount of catalyst employed is not critical and may be varied over a wide range. In practice, however, a minor effective amount of catalyst will be employed ranging from about 0.1% up to about 10% by weight based on the weight of the organic isocyanate.

This reaction may be conducted in the presence of a solvent which is substantially inert to the reactants under reaction conditions. The solvent promotes the formation of a homogeneous solution thereby facilitating the reaction. The solvent may be removed from the reaction product by simple distillation on completion of the reaction. Typical solvents which may be employed include dioxane, dimethylformamide, and acetonitrile.

Normally the reaction will be conducted at a somewhat elevated temperature. Desirably, temperatures above about 100° C. will be employed, the preferred temperature range being from about 150 to 250° C. During the reaction, there will be a moderate pressure decrease within the sealed reaction vessel. Under the stated conditions, yields of 2-oxazolidones substantially in excess of 90% have been obtained.

The following examples illustrate the present invention. The pressure is given in millimeters (mm.) of mercury absolute.

EXAMPLE I

*Preparation of 3-phenyl-2-oxazolidone*

To a 1400 ml. rocking autoclave was added the following materials: phenylisocyanate 100 g., ethylene oxide 50 g., tetraethylammonium bromide 3 g., and 300 ml. of dioxane. The reaction mixture was heated to 200° C. and held at this temperature for one hour. An autogenous pressure of 190 p.s.i.g. developed. Solid 3-phenyl-2-oxazolidone separated from the reaction mixture amounting to 100 g. By evaporating the dioxane at 40 mm. pressure, an additional 26 g. of product was obtained. The product was purified by washing with ether and recrystallized by use of dioxane. The purified product had a melting point of 119.8–120.2° C. (uncorr.). A mixed melting point with authentic 3-phenyl-2-oxazolidone was 120–120.4° C. The infrared spectra of authentic 3-phenyl-2-oxazolidone and the material prepared in this experiment were identical.

EXAMPLE II

*Preparation 3-phenyl-5-methyl-2-oxazolidone*

To a 1400 ml. rocking autoclave was added 100 g. of phenylisocyanate, 75 g. of propylene oxide, 3 g. of tetraethylammonium bromide and 300 ml. of dioxane. The reaction mixture was heated to 200° C. and held at 200–220° C. for one hour during which time an autogenous pressure of 250 p.s.i.g. developed. Following this, the solvent and unreacted propylene oxide were removed by distillation at 40 mm. pressure to a pot temperature of 140° C. A brown oil (154 g.) was obtained which solidified to a yellow-brown solid. After several recrystallizations from ethanol, 95 g. of product was separated which had a M.P. of 79.5–81.5° C. A mixed melting point with known 3-phenyl-5-methyl-2-oxazolidone was 79.5–81.5° C. The infrared spectra of the two samples were identical. Calcd. for $C_{10}H_{11}O_2N$: percent C=67.78; percent H=6.26. Found by analysis: percent C=67.62; percent H=6.15.

EXAMPLE III

*Preparation of 2,4-bis(3-oxazolidonyl)toluene*

To the 1400 ml. rocking autoclave was added 124 g. of 2,4-toluenediisocyanate, 100 ml. of ethylene oxide, 300 ml. of dimethyl formamide and 3 g. of tetraethylammonium bromide. The reactants were heated to 200–225° C. and held at this temperature for fifty minutes. The solvent was distilled at 5 mm. pressure to a pot temperature of 135° C. A black oil remained which weighed 203 g. The oil was added to 200 g. of benzene and the mixture boiled. That portion of the oil which dissolved in benzene was decanted and allowed to stand overnight. Brown-yellow crystals were obtained. After repeatedly taking up small amounts of oily product in benzene a total of 101 g. of crystals were obtained. An analytical sample was obtained by recrystallization of a portion of these crystals from ethanol, with charcoal and filter aid; and a final recrystallization using benzene as a solvent. Calcd. for $C_{13}H_{14}O_4N_2$: percent C=59.53; percent H=5.38. Found: percent C=59.50; percent H=5.25. It will be appreciated that this involves the addition of two molecules of ethylene oxide to one diisocyanate molecule, the substitution in the 3-position of either 2-oxazolidone radical being X—A—, where A represents the 2,4-methylphenyl radical and X is the other 2-oxazolidone radical.

EXAMPLE IV

*Preparation of 3-ethyl-2-oxazolidone*

To a 310 ml. stainless rocking autoclave was added 24 g. of ethylisocyanate, 22 g. of ethylene oxide, 0.4 g. of tetraethylammonium bromide and 100 ml. of acetonitrile. The reaction mixture was heated to 200° C. and held at that temperature for 90 minutes. The reaction mixture was distilled through 2.5 x 25 cm. packed column and 10 g. of 3-ethyl-2-oxazolidone was obtained boiling at 129–130° C. at 10 mm. pressure (N26/D=1.4515). A sample of 3-ethyl-2-oxazolidone was prepared from N-ethylethanolamine and diethyl carbonate. This latter sample boiled at 129° C. under 10 mm. of mercury pressure and had an N26/D=1.4508. The infrared absorption spectra of the two samples were similar.

EXAMPLE V

*Preparation of 3-phenyl-5-n-decyl-2-oxazolidone*

To a 300 ml. 3-necked flask equipped with a stirrer, thermometer, condenser and drying tube was added 50 ml. of dimethylformamide, 18.4 g. of 1,2-dodecylene oxide, 11.9 g. of phenylisocyanate and 0.2 g. of tetraethylammonium bromide. The reaction mixture was heated to 160° C. and held at this temperature for three hours. The solvent was removed at 10 mm. of mercury pressure and 250 ml. of low-boiling petroleum ether was added. After crystallization from this solvent, 7.2 g. of product was obtained which melted at 68.5–69.7° C. A known sample of 3-phenyl-5-n-decyl-2-oxazolidone had a melting point of 68.5–69.7° C. and the mixed melting point test gave a melting point range of 68.5–69.8° C. indicating that the materials were identical.

EXAMPLE VI

*Preparation of a resin by the reaction of a diepoxide and a diisocyanate*

To a 3-necked 300 ml. flask equipped with a stirrer, thermometer, condenser and drying tube was added 14 g. of vinylcyclohexene dioxide, 17.4 g. of 2,4-toluene-diisocyanate, 0.2 g. of tetraethylammonium bromide and 50 ml. of dimethyl-formamide. The reaction mixture was heated to 156° C. and held at this temperature for four hours. The solvent was removed at 10 mm. of mercury pressure and a solid resin collected. The lightly colored polymer was dried in a vacuum oven at 60° C. for four hours. The polymer weighed 31 g. and was infusible at temperatures up to 300° C. The resin was insoluble in boiling xylene or dioxane but soluble in boiling dimethylformamide.

EXAMPLE VII

To a 300 ml. rocking autoclave was added 75 ml. of acetonitrile, 11.9 g. of phenylisocyanate and 0.3 g. of potassium iodide. The reaction vessel was assembled and 15 ml. of ethylene oxide added. The reaction mixture was heated for two hours at 160° C. during which time the pressure dropped from 175 to 155 p.s.i.g. The acetonitrile was removed under vacuum and the remaining crystals treated with boiling dioxane which turned a reddish-brown color. A substantial yield of 3-phenyloxazolidone was recovered. The 3 - phenyl - oxazolidone melted at 119° C.

EXAMPLE VIII

The experiment conducted under Example VII was repeated except that 0.4 ml. of triethylamine was employed as the catalyst. The product was obtained as a solid melting in the range of 110–116° C. On recrystallization of this material from dioxane, there was obtained a substantial yield of 3-phenyloxazolidone melting at 117–119° C.

EXAMPLE IX

To a 3-necked 300 ml. reaction flask equipped with a stirrer, nitrogen inlet, thermometer and condenser was added 20 g. of the diepoxide obtained from epichlorohydrin and bis(4-hydroxyphenyl) dimethylmethane, 17.4 g. of 2,4-toluene-diisocyanate and 0.4 g. of tetramethylammonium iodide. The reaction mixture was heated with stirring to 125° C. at which temperature the mixture began to thicken. The prepolymer was heated for an additional four hours at 165° C. 37 g. of a yellow resin was obtained which showed no tendency to melt at 300° C.

Obviously many modifications and variations of the invention, as hereinbefore set forth, may be made without departing from the spirit and scope thereof, and therefore only such limitations should be imposed as are indicated in the appended claims.

I claim:
1. A method for converting a $C_2$ to $C_{12}$ aliphatic hydrocarbon monoepoxide to a corresponding 3-substituted-2-oxazolidone product which comprises reacting each mol of epoxide group to be converted with an equivalent amount of hydrocarbon monoisocyanate at a temperature within the range of about 100° to about 250° C. in the presence of a catalytically effective amount of an addition catalyst selected from the group consisting of trialkylamines, alkali metal halides and ammonium compounds represented by the formula:

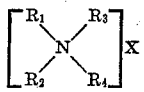

in which X is an atom consisting of fluoride, chloride, bromide and iodide and $R_1$, $R_2$, $R_3$ and $R_4$ each represent a member selected from the group consisting of hydrogen and alkyl, cycloalkyl, aryl, alkaryl and aralkyl hydrocarbon radicals having 2 to 20 carbon atoms, the carbon atoms of said epoxide group being in vicinal relationship to each other.

2. A method as in claim 1 wherein the catalyst is an ammonium compound.

3. A method as in claim 1 wherein the catalyst is a trialkylamine.

4. A method as in claim 1 wherein the catalyst is an alkali metal halide.

5. A method for preparing 3-phenyl-2-oxazolidone which comprises reacting phenylisocyanate with an equivalent amount of ethylene oxide in solvent solution in the presence of a catalytically effective amount of tetraethyl ammonium bromide at a temperature within the range of about 100° to about 250° C., the carbon atoms of said epoxide group being in vicinal relationship to each other.

6. A method for preparing 3-phenyl-5-methyl-2-oxazolidone which comprises reacting phenylisocyanate with an equivalent amount of propylene oxide in solvent solution in the presence of a catalytically effective amount of tetraethyl ammonium bromide at a temperature within the range of about 100° to about 250° C., the carbon atoms of said epoxide group being in vicinal relationship to each other.

7. A method for preparing a di-2-oxazolidone which comprises reacting a toluene diisocyanate with an equivalent amount of ethylene oxide in solvent solution in the presence of a catalytically effective amount of tetraethyl ammonium bromide at a temperature within the range of about 100° to about 250° C., the carbon atoms of said epoxide group being in vicinal relationship to each other.

8. A method for preparing 3-ethyl-2-oxazolidone which comprises reacting ethylisocyanate with an equivalent amount of ethylene oxide in solvent solution in the presence of a catalytically effective amount of tetraethyl ammonium bromide at a temperature within the range of about 100° to about 250° C., the carbon atoms of said epoxide group being in vicinal relationship to each other.

9. A method for preparing a 3-phenyl-2-oxazolidone product which comprises reacting phenylisocyanate with an equivalent amount of 1,2-dodecylene oxide in solvent solution in the presence of a catalytically effective amount of tetraethyl ammonium bromide at a temperature within the range of about 100° to about 250° C., the carbon atoms of said epoxide group being in vicinal relationship to each other.

10. A method for preparing a 2-oxazolidone polymer which comprises reacting a hydrocarbon diisocyanate with a hydrocarbon diepoxide containing reactive epoxide groups at a temperature within the range of about 100° to about 250° C. in the presence of a catalyst selected from the group consisting of trialkylamines, alkali metal halides and ammonium compounds represented by the formula:

$$\left[ \begin{array}{cc} R_1 & R_3 \\ \diagdown & \diagup \\ & N \\ \diagup & \diagdown \\ R_2 & R_4 \end{array} \right] X$$

in which X is an atom consisting of fluoride, chloride, bromide and iodide and $R_1$, $R_2$, $R_3$ and $R_4$ each represent a member selected from the group consisting of hydrogen and alkyl, cycloalkyl, aryl, alkaryl and aralkyl hydrocarbon radicals having 2 to 20 carbon atoms, the carbon atoms of said epoxide groups being in vicinal relationship to each other.

11. A method as in claim 10 wherein the reaction is conducted in solvent solution in the presence of from about 0.1 to about 10 wt. percent of said catalyst, based on the weight of the polyisocyanate.

12. A method as in claim 11 wherein the isocyanate is a toluene diisocyanate and the epoxide is vinyl cyclohexene dioxide.

13. A method for preparing a 2-oxazolidone polymer which comprises reacting a toluene diisocyanate with the diepoxide obtained by the reaction of epichlorohydrin with bis(4-hydroxyphenyl) dimethylmethane at a temperature within the range of about 100° to about 250° C. in the presence of a catalyst selected from the group consisting of trialkylamine, alkali metal halides and ammonium compounds represented by the formula:

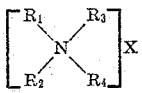

in which X is an atom consisting of fluoride, chloride, bromide and iodide and $R_1$, $R_2$, $R_3$ and $R_4$ each represent a member selected from the group consisting of hydrogen and alkyl, cycloalkyl, aryl, alkaryl and aralkyl hydrocarbon radicals having 2 to 20 carbon atoms, the carbon atoms of said epoxide groups being in vicinal relationship to each other.

14. A method for converting a $C_2$ to $C_{12}$ hydrocarbon monoepoxide to a corresponding di-3-substituted-2-oxazolidone product which comprises reacting each mol of epoxide to be converted with 0.5 mol of a hydrocarbon diisocyanate at a temperature within the range of about 100° to about 250° C. in the presence of a catalytically effective amount of an addition catalyst selected from the group consisting of trialkylamines, alkali metal halides and ammonium compounds represented by the formula:

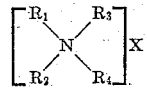

in which X is an atom consisting of fluoride, chloride, bromide and iodide and $R_1$, $R_2$, $R_3$ and $R_4$ each represent a member selected from the group consisting of hydrogen and alkyl, cycloalkyl, aryl, alkaryl and aralkyl hydrocarbon radicals having 2 to 20 carbon atoms, the carbon atoms of said epoxide group being in vicinal relationship to each other.

References Cited in the file of this patent

UNITED STATES PATENTS

| | | |
|---|---|---|
| 2,594,979 | Nelson | Apr. 29, 1952 |
| 2,602,075 | Carpenter et al. | July 1, 1952 |
| 2,788,335 | Barthel | Apr. 9, 1957 |
| 2,799,663 | Hampton et al. | July 16, 1957 |
| 2,977,370 | Oken | Mar. 28, 1961 |

FOREIGN PATENTS

| | | |
|---|---|---|
| 870,471 | France | Dec. 12, 1941 |

OTHER REFERENCES

Schildknecht: "Polymer Processes" (1956), pages 439–441.

Jones et al.: J. Chem. Soc., London, 1957, pages 4392–4.